United States Patent
Fujibayashi et al.

(10) Patent No.: US 10,178,254 B2
(45) Date of Patent: Jan. 8, 2019

(54) IMAGE RECORDING APPARATUS INCLUDING COVER UNIT MOUNTED IN OPENABLE AND CLOSABLE MANNER ABOVE IMAGE RECORDING UNIT

(71) Applicant: CANON KABUSHIKI KAISHA, Tokyo (JP)

(72) Inventors: Mitsuyuki Fujibayashi, Kawasaki (JP); Haruo Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/651,870

(22) Filed: Jul. 17, 2017

(65) Prior Publication Data
US 2018/0034989 A1    Feb. 1, 2018

(30) Foreign Application Priority Data
Jul. 29, 2016   (JP) .................................. 2016-150118

(51) Int. Cl.
*G03G 21/16*     (2006.01)
*H04N 1/00*      (2006.01)
(Continued)

(52) U.S. Cl.
CPC .......... *H04N 1/00557* (2013.01); *B41J 29/02* (2013.01); *B41J 29/13* (2013.01); *G03G 21/1628* (2013.01); *G03G 21/1633* (2013.01); *H04N 1/00551* (2013.01); *H04N 1/00554* (2013.01); *H04N 1/00559* (2013.01); *H04N 1/04* (2013.01); *G03G 21/1619* (2013.01); *G03G 21/1642* (2013.01); *G03G 21/1647* (2013.01); *G03G 2221/1651* (2013.01); *G03G 2221/1687* (2013.01); *H04N 1/00519* (2013.01);
(Continued)

(58) Field of Classification Search
CPC ........... G03G 21/1633; G03G 21/1628; H04N 1/00557; H04N 1/00554; H04N 1/04
See application file for complete search history.

(56) References Cited

U.S. PATENT DOCUMENTS

2002/0118403 A1* 8/2002 Kameyama ........ H04N 1/00543
                                                             358/474
2002/0170143 A1   11/2002 Vitry
(Continued)

FOREIGN PATENT DOCUMENTS

JP        2006080864 A        3/2006
JP        2009290515 A       12/2009

*Primary Examiner* — Sandra Brase
(74) *Attorney, Agent, or Firm* — Canon U.S.A., Inc. IP Division

(57) ABSTRACT

An image reading and recording apparatus includes an image recording unit and an image reading unit supported to be pivotally movable above the image recording unit and configured to be opened and closed by being pivotally moved relative to the image recording unit. The apparatus includes a stay including an opening portion formed thereon, a rotor inserted in the opening portion of the stay, a first cam surface provided on an inner peripheral portion of the opening portion, and a second cam surface provided on an outer peripheral portion of the rotor. The rotor rotates due to abutment of the first cam surface and the second cam surface with each other. The image reading unit is held in a first opened state with a first open angle, due to meshed engagement of the first cam surface and the second cam surface with each other.

8 Claims, 10 Drawing Sheets

(51) Int. Cl.
  *H04N 1/04*     (2006.01)
  *B41J 29/02*    (2006.01)
  *B41J 29/13*    (2006.01)

(52) U.S. Cl.
  CPC ..... *H04N 1/00525* (2013.01); *H04N 1/00543* (2013.01); *H04N 2201/0081* (2013.01); *H04N 2201/0082* (2013.01); *H04N 2201/0094* (2013.01); *H04N 2201/0422* (2013.01)

(56) References Cited

U.S. PATENT DOCUMENTS

| | | |
|---|---|---|
| 2009/0297210 A1 | 12/2009 | Matsumoto |
| 2009/0300878 A1 | 12/2009 | Suzuki |
| 2012/0080987 A1 | 4/2012 | Takamori |
| 2014/0293359 A1* | 10/2014 | Niikawa ............ H04N 1/00543 358/300 |
| 2017/0067278 A1 | 3/2017 | Tomatsu |

* cited by examiner

IMAGE RECORDING APPARATUS INCLUDING COVER UNIT MOUNTED IN OPENABLE AND CLOSABLE MANNER ABOVE IMAGE RECORDING UNIT

BACKGROUND OF THE INVENTION

Field of the Invention

The present invention relates to an image recording apparatus including a cover unit mounted in an openable and closable manner above a recording unit that records an image.

Description of the Related Art

Typically, an image reading and recording apparatus including an image reading unit that reads an image and an image recording unit that records the image is configured in such a manner that the image reading unit and the image recording unit are arranged in a vertical direction, when the apparatus is placed horizontally on a surface for normal use. In particular, the image reading unit is often provided on top of the image recording unit.

Further, the image recording unit is equipped with constituent portions requiring maintenance, such as a recording unit that records the image onto a recording medium such as paper and a conveyance unit that conveys the recording medium. Therefore, in the case where the image reading unit is provided on top of the image recording unit, the top of the image recording unit, located under the image reading unit, needs to be exposed by displacing the image reading unit and the image recording unit relative to each other, to carry out the maintenance of constituent portions. Further, it is desirable that the image recording apparatus is kept in a state in which the top of the image recording unit is exposed even without holding the image reading unit with the user's hand, to allow the maintenance to be easily carried out.

In an image forming apparatus discussed in Japanese Patent Application Laid-Open No. 2009-290515, an image reading unit is provided on top of an image recording unit. This image forming apparatus is provided with an opening and closing mechanism that connects the image reading unit to the image recording unit in such a manner that the image reading unit is openable with respect to the image recording unit with use of a hinge mechanism. This opening and closing mechanism couples a top surface portion of the image recording unit and a bottom surface portion of the image reading unit with a stay movable in conjunction with an operation of opening/closing the image recording unit. Further, the opening and closing mechanism fixes the stay with the image reading unit opened at a desired open angle with use of a cam lever that swings in conjunction with the operation of opening/closing the image recording unit, thereby keeping the image reading unit in the state opened at the desired open angle.

However, the image forming apparatus discussed in Japanese Patent Application Laid-Open No. 2009-290515 uses the cam lever that swings in a pivotal axis direction of the image recording unit. Accordingly, a space corresponding to a traveling range of the cam lever needs to be provided in addition to a space where the opening and closing mechanism is contained, thus involving a possibility of leading to an increase in a size of the apparatus.

SUMMARY OF THE INVENTION

According to an aspect of the present invention, an image recording apparatus, which is equipped with a recording unit including a recording head configured to carry out recording onto a recording medium and a cover unit supported to be pivotally movable above the recording unit and configured to be opened and closed by being pivotally moved relative to the recording unit, includes a stay attached to a bottom surface of the cover unit and including an opening portion formed thereon, a rotor attached to the recording unit and inserted in the opening portion, a first cam surface provided on an inner peripheral portion of the opening portion, and a second cam surface provided on an outer peripheral portion of the rotor. The rotor rotates due to abutment of the first cam surface and the second cam surface with each other according to the opening or the closing of the cover unit. The cover unit is held in a first opened state in which the cover unit is opened at a first open angle, due to meshed engagement of the first cam surface and the second cam surface with each other.

Further features of the present invention will become apparent from the following description of exemplary embodiments with reference to the attached drawings.

DESCRIPTION OF THE EMBODIMENTS

Figure 1:
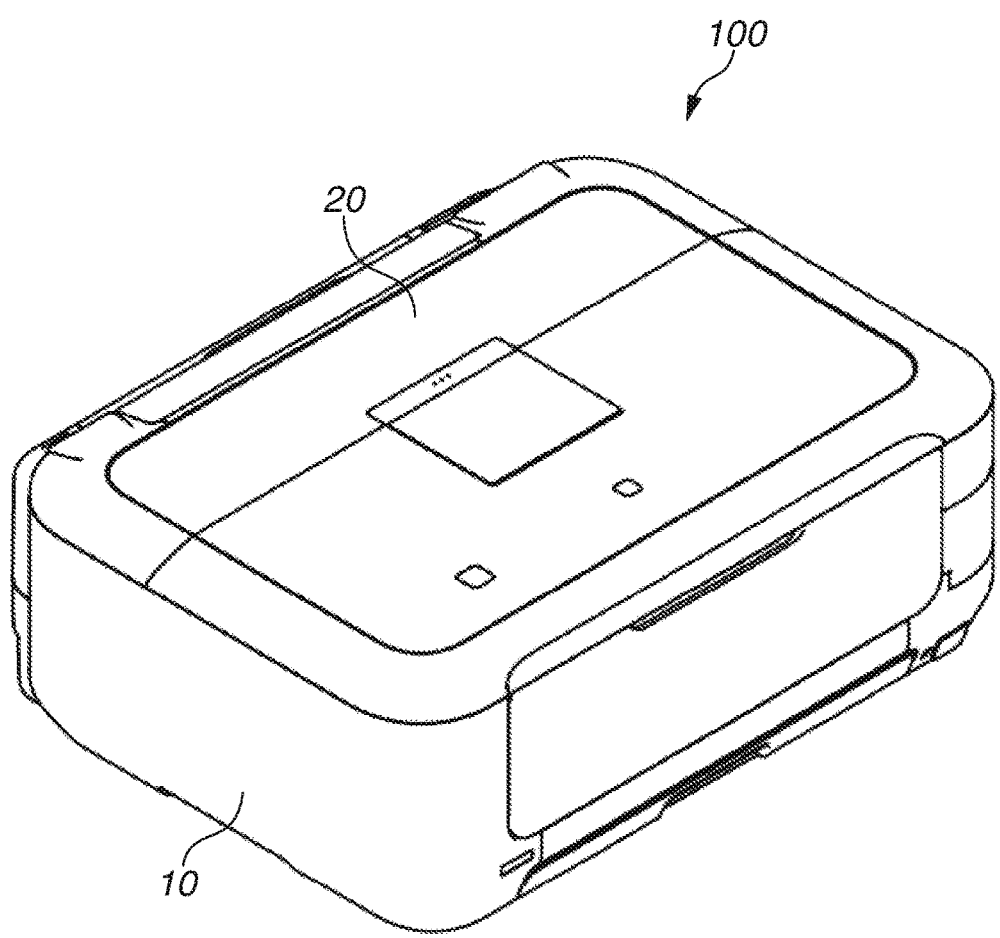
FIG. 1 is a perspective view schematically illustrating an image reading and recording apparatus according to a first exemplary embodiment of the present invention.

In the following description, exemplary embodiments of the present invention will be described with reference to the drawings. Components having similar functions will be identified by the same reference numeral in each of the drawings, and a description thereof may be omitted. Each of the embodiments of the present invention described below can be implemented solely or as a combination of a plurality of the embodiments or features thereof where necessary or where the combination of elements or features from individual embodiments in a single embodiment is beneficial.

FIG. 1 is a perspective view schematically illustrating an image reading and recording apparatus according to a first exemplary embodiment of the present invention. An image reading and recording apparatus 100 illustrated in FIG. 1 includes an image recording unit 10, which is an image recording unit that records an image, and an image reading unit 20, which reads the image. The image recording unit 10 and the image reading unit 20 are provided while being arranged in a vertical direction. More specifically, the image recording unit 10 is a recording unit provided at a lower portion of the image reading and recording apparatus 100, and the image reading unit 20 is a cover unit provided above the image recording unit 10 and movable relative to the image recording unit 10. In the present exemplary embodiment, to image reading unit 20 is supported to be pivotally movable above the image recording unit 10, and is opened and closed by being pivotally moved relative to the image recording unit 10.

Figure 2:
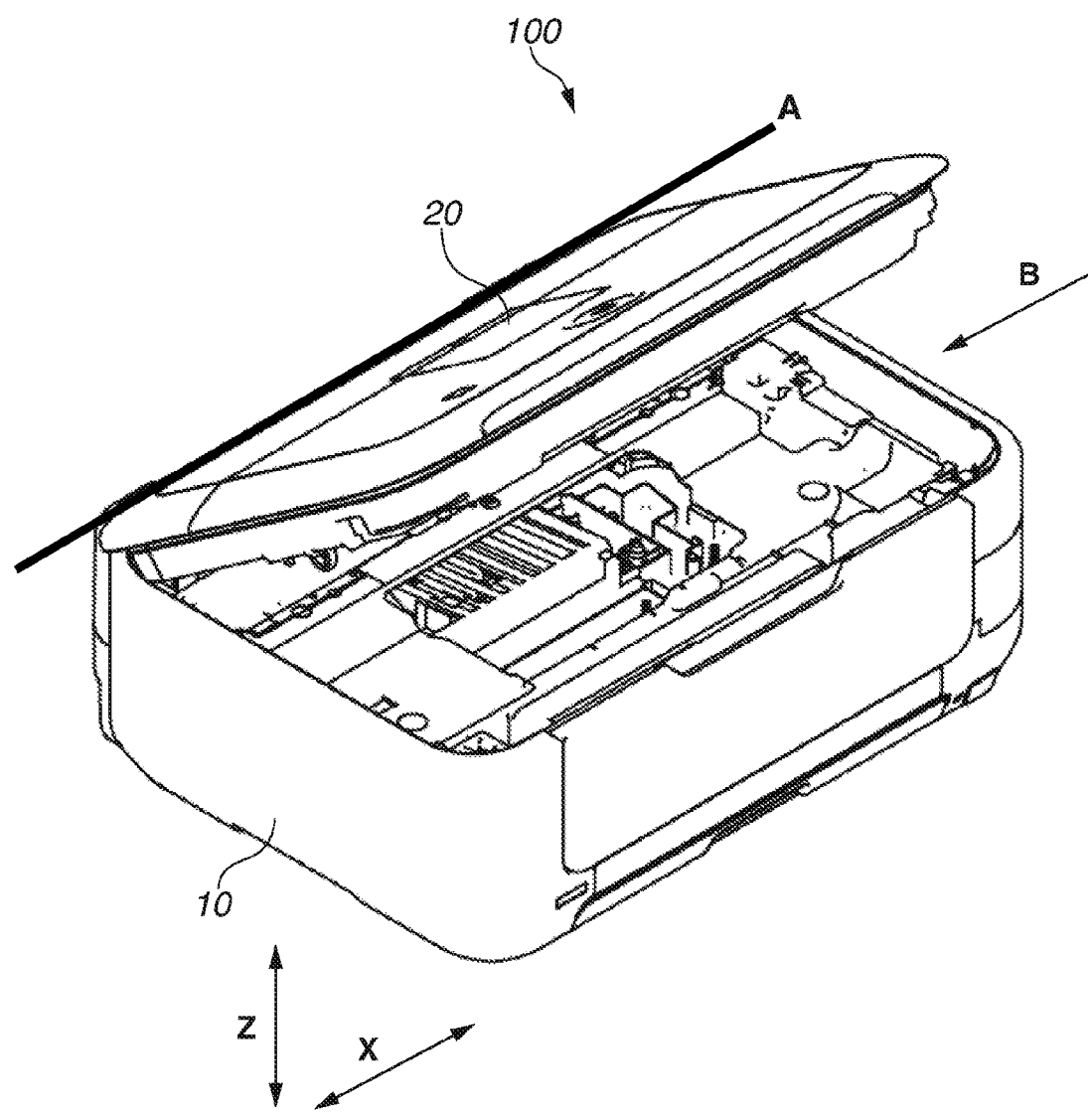
FIG. 2 is a perspective view schematically illustrating the image reading and recording apparatus with an image reading unit in an opened state.

FIG. 2 is an outline perspective view schematically illustrating the image reading and recording apparatus 100 an opened state in which the image reading unit 20 is open with respect to the image recording unit 10. In the example illustrated in FIG. 2, the image reading unit 20 is supported to be pivotally movable relative to the image recording unit 10, and is opened and closed with respect to the image recording unit 10 by being moved pivotally around a pivotal axis A. As illustrated in FIG. 2, a direction along the pivotal axis A is referred to as an X direction, and the vertical direction is referred to as a Z direction. The image reading and recording apparatus 100 operates by power supplied via, for example, a power source cable, and records the image and reads the image according to an instruction from an external apparatus such as a computer, or an operation panel provided on the image reading and recording apparatus 100.

Figure 3:
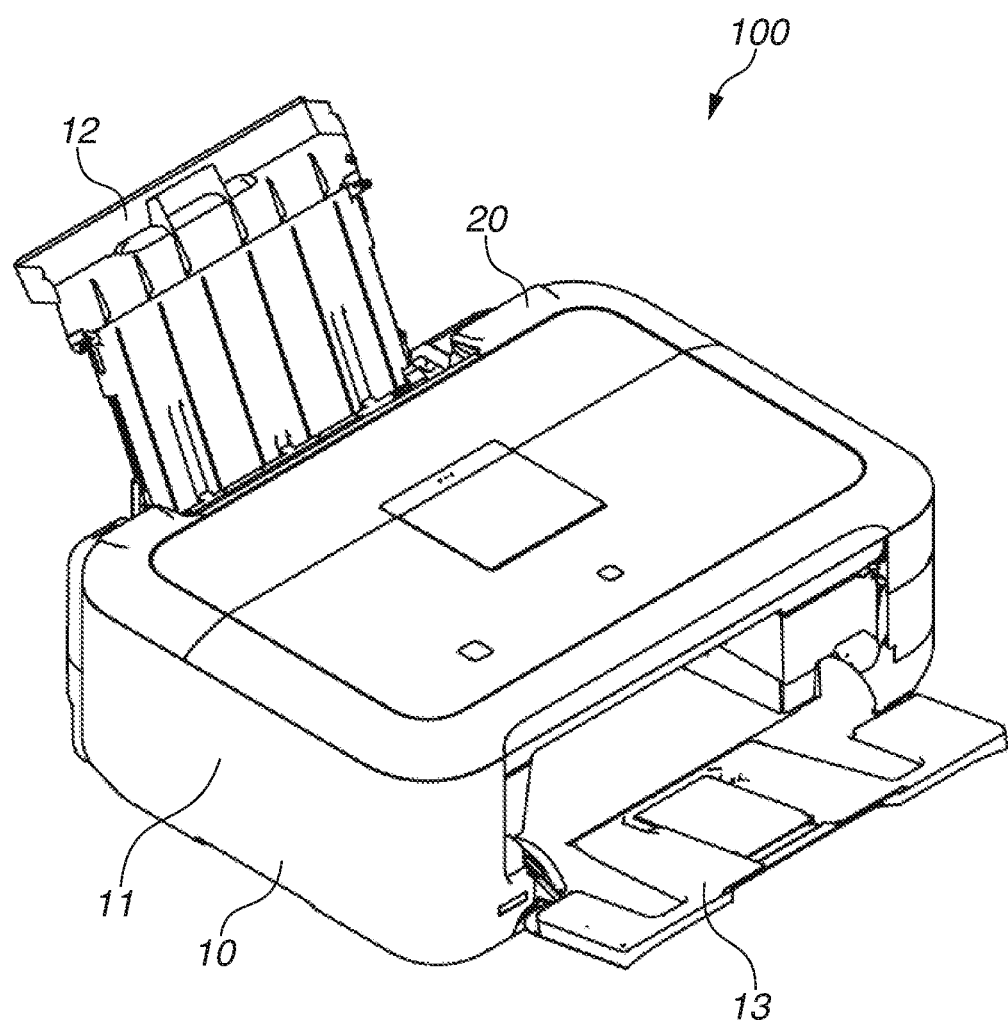
FIG. 3 is a perspective view schematically illustrating the image reading and recording apparatus when the image reading and recording apparatus performs a recording operation.

FIG. 3 is a perspective view schematically illustrating the image reading and recording apparatus 100 when the image reading and recording apparatus 100 performs an image recording operation. The image reading and recording apparatus 100 illustrated in FIG. 3 includes an image recording execution unit 11, which is equipped with a recording head that records the image on a recording medium, a feeding unit 12, which feeds the recording medium to the image recording execution unit 11, and a sheet discharge unit 13, which discharges the recording medium subjected to the recording by the image recording execution unit 11, as the image recording unit 10.

The image recording unit 10 conveys the recording medium placed on the feeding unit 12 with use of a sheet conveyance unit (not illustrated) up to a position in the image recording execution unit 11 where the image can be recorded. Then, the image recording unit 10 records the image onto the conveyed recording medium according to the recording instruction input from the external apparatus or the operation panel. The image recording unit 10 discharges this recording medium with the image recorded thereon to the sheet discharge unit 13.

Figure 4:
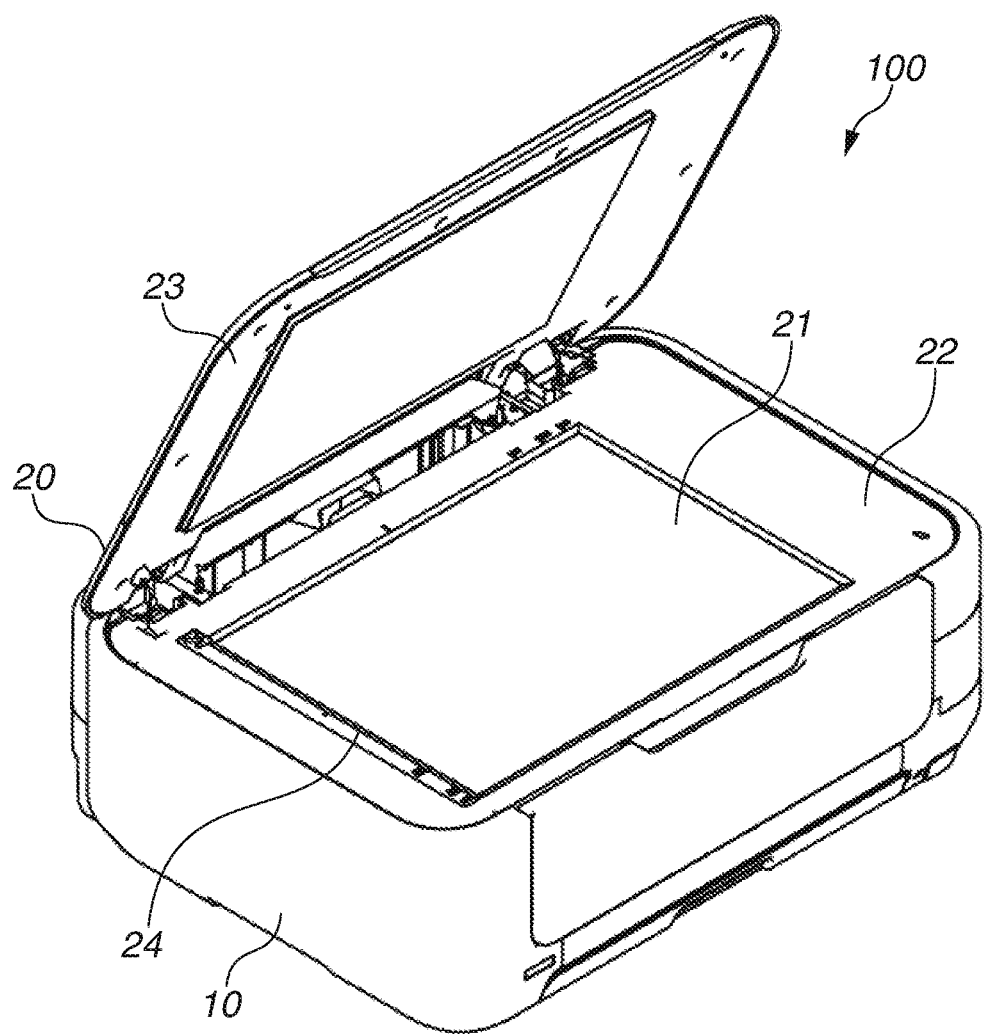
FIG. 4 is a perspective view schematically illustrating the image reading and recording apparatus when the image reading and recording apparatus performs a reading operation.

FIG. 4 is a perspective view schematically illustrating the image reading and recording apparatus 100 when the image reading and recording apparatus 100 performs a reading operation of reading the image. The image reading and recording apparatus 100 illustrated in FIG. 4 includes a casing 22, which is equipped with a positioning plate 21 where a document is placed, and a pressing plate 23, which presses the document placed on the positioning plate 21, as the image reading unit 20. A reading unit 24, which reads an image recorded on the document placed on the positioning plate 21, is contained inside the casing 22. The pressing plate 23 also has a function of shielding the image reading unit 20 inside the casing 22 from external light.

The image reading unit 20 reads the image recorded on the document with the document placed on the positioning plate 21 and pressed by the pressing plate 23. At this time, the document is placed in such a manner that a surface with the image recorded thereon faces the positioning plate 21. The image reading and recording apparatus 100 may transmit image data indicating this read image to an external apparatus (not illustrated) or may record this read image onto the recording medium with use of the image recording unit 10.

Figure 5:
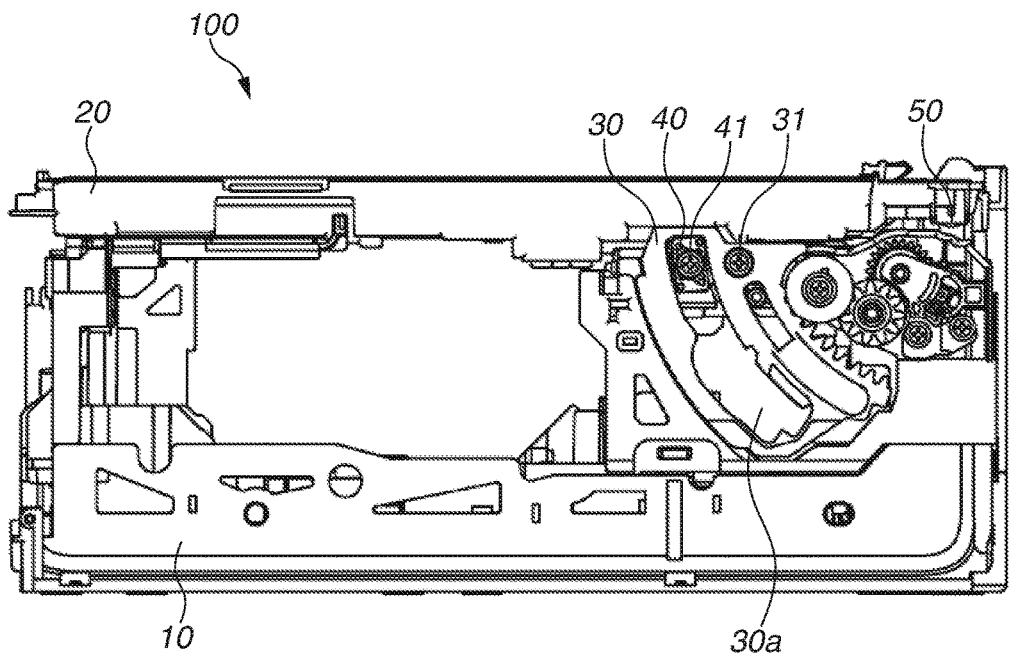
FIG. 5 is a transparent side view schematically illustrating the image reading and recording apparatus in a closed state.
Figure 6:
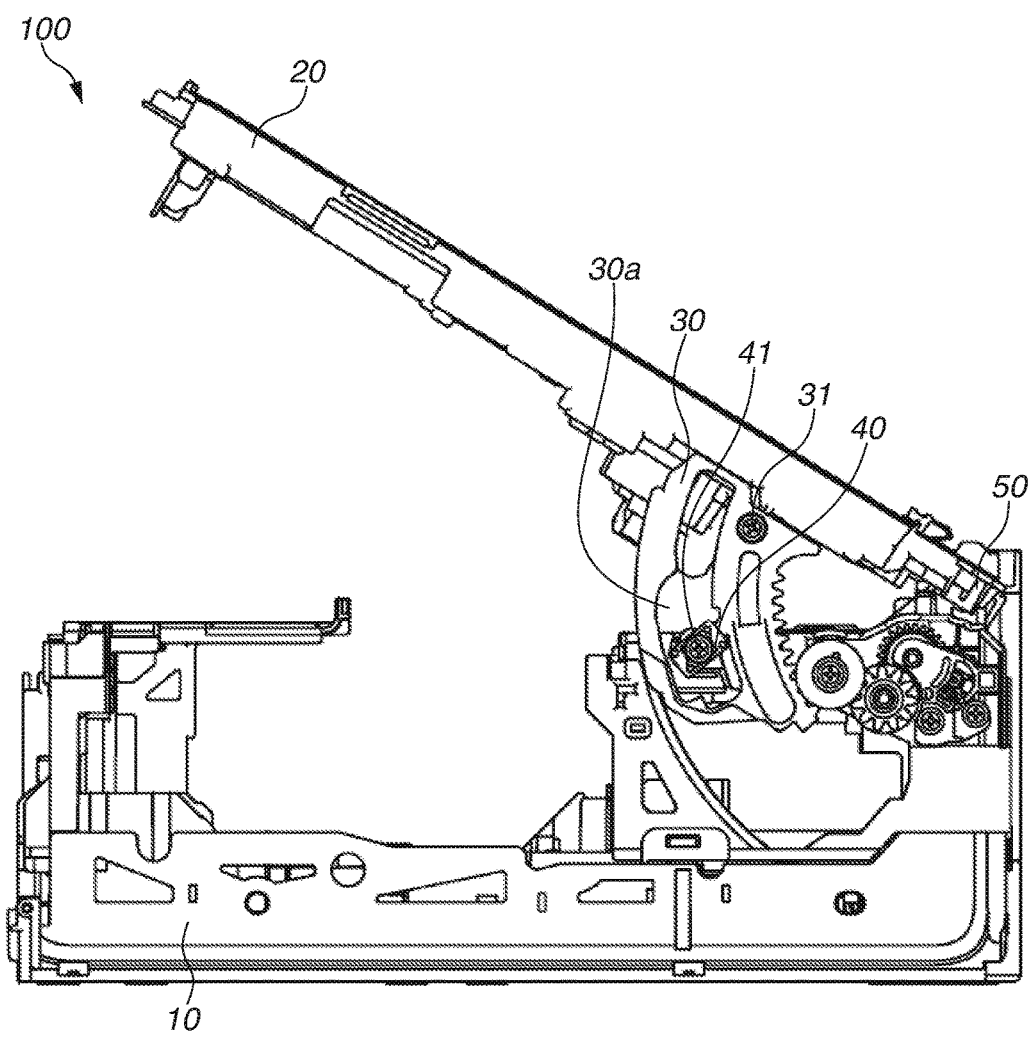
FIG. 6 is a transparent side view schematically illustrating the image reading and recording apparatus in the opened state.

FIGS. 5 and 6 are transparent side views schematically illustrating the image reading and recording apparatus 100 as viewed from a B direction indicated by an arrow in FIG. 2. More specifically, FIG. 5 illustrates the image reading and recording apparatus 100 in a closed state in which the image reading unit 20 is closed with respect to the image recording unit 10. In the closed state, the image recording unit 10 is covered with the image reading unit 20. FIG. 6 illustrates the image reading and recording apparatus 100 in the opened state in which the image reading unit 20 is open with respect to the image recording unit 10.

As illustrated in FIGS. 5 and 6, the image reading and recording apparatus 100 includes an opening and closing mechanism 50 that pivotally supports the image reading unit in the manner pivotally movable relative to the image recording unit 10. The image reading unit 20 is moved pivotally around the pivotal axis A illustrated in FIG. 2 due to the opening and closing mechanism 50, by which the image reading unit 20 is opened and closed with respect to the image recording unit 10. Hereinafter, a direction in which the image reading unit 20 is opened will be referred to as a +R direction, and a direction in which the image reading unit 20 is closed will be referred to as a −R direction. The opening and closing mechanism 50 is, for example, a hinge mechanism.

A stay 30 shaped like a thin plate is attached to a bottom surface portion on a right side (one side pivotally supported by the opening and closing mechanism 50) of the image reading unit 20. In the present exemplary embodiment, the stay 30 is attached with use of a screw 31 in such a manner that front and back surfaces thereof extend substantially perpendicularly to the pivotal axis A of the image reading unit 20, and is configured to be moved together with the image reading unit 20 in conjunction with the opening/closing operation of the image reading unit 20. Further, the stay 30 includes an opening portion 30a formed through the front and back surfaces.

Further, a rotor 40 shaped like a thin plate is attached to a top surface portion on a right side of the image recording unit 10. In the present exemplary embodiment, the rotor 40 is inserted in the opening portion 30a of the stay 30, and is attached in the opening portion 30a with use of a screw 41 rotatably around an axis substantially parallel with the pivotal axis A of the image reading unit 20.

Figure 7:
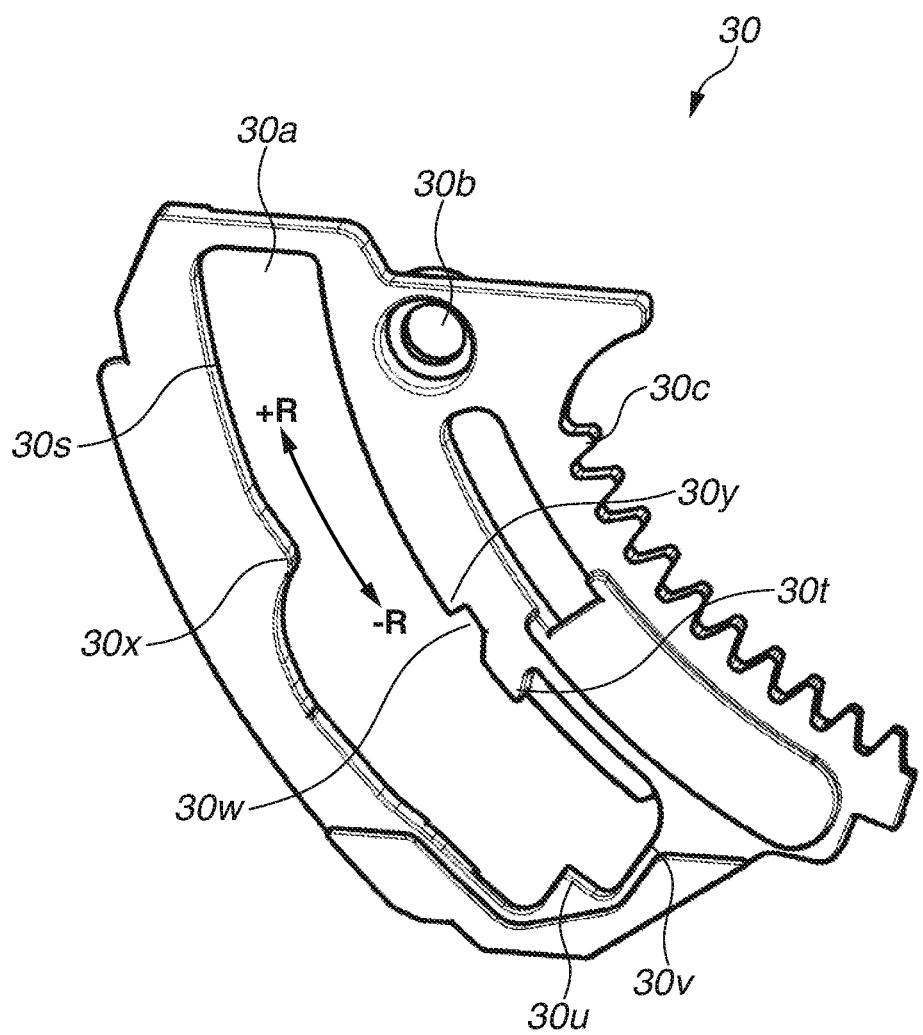
FIG. 7 is a perspective view schematically illustrating a stay.

FIG. 7 is a perspective view schematically illustrating the stay 30. As illustrated in FIG. 7, the opening portion 30a, in which the rotor 40 is inserted, a hole portion 30b, in which the screw 31 is inserted, and an inner gear 30c, which is an arc-shaped rack, are integrally formed on the stay 30. The stay 30 is attached to the image reading unit 20 in such a manner that the inner gear 30c faces the opening and closing mechanism 50 side.

Cam surfaces $30s$ to $30y$, which form a first cam surface in abutment with the rotor 40 according to the opening/closing operation of the image reading unit 20, are formed on an inner peripheral portion of the opening portion $30a$. The cam surface $30s$ is a surface formed at an upper portion (an edge in the +R direction) of the opening portion 30a and substantially squared U-shaped in cross section. The cam surface 30x is a surface formed at one end edge of the cam surface 30s and having a protruding shape, and the cam surface 30y is a surface formed at the other end edge of the cam surface 30s and having a protruding shape. The cam surface 30u is a surface formed at a lower portion of the opening portion 30a and having a protruding shape, and the cam surface 30v is a surface formed adjacent to the cam surface 30u on the opening and closing mechanism 50 side and having a flat shape. The cam surface 30w is a surface formed adjacent to the cam surface 30y in the −R direction and having a recessed shape. The cam surface 30t is a surface formed adjacent to the cam surface 30w in the −R direction and having a protruding shape. The vertical direction indicates a vertical direction when the stay 30 is attached to the image reading unit 20. Further, the inner gear 30c is not used in the present exemplary embodiment but is used in a second exemplary embodiment, and therefore will be described in a description of the second exemplary embodiment.

Figure 8:
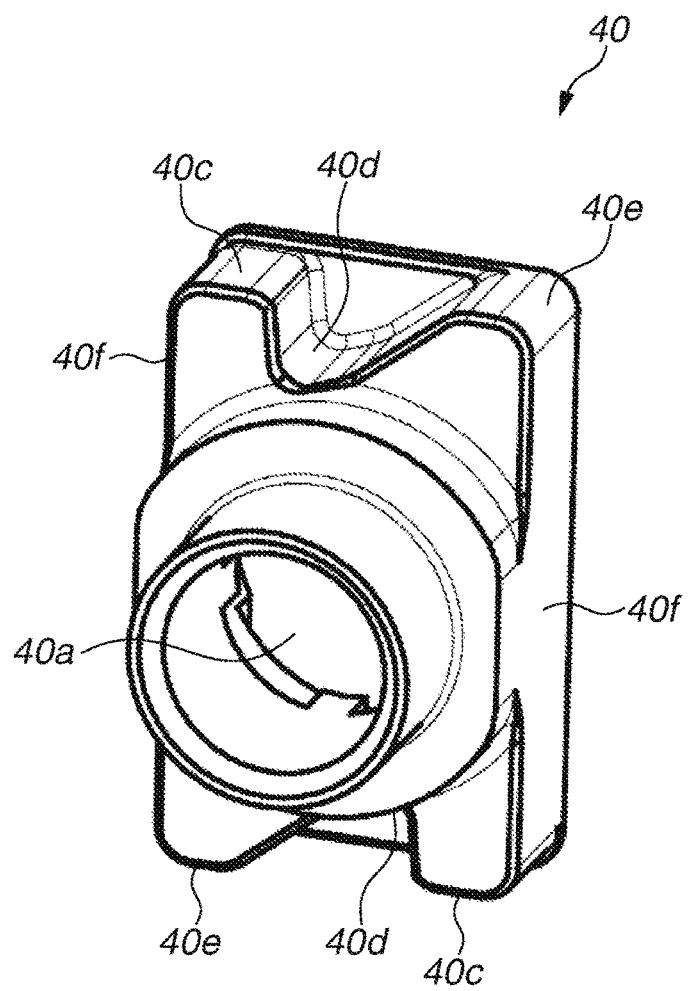
FIG. 8 is a perspective view schematically illustrating a rotor.

FIG. 8 is a perspective view schematically illustrating the rotor 40. FIG. 8 illustrates the rotor 40 as viewed from an opposite side of the side illustrated in FIGS. 5 and 6. A hole portion 40a, in which the screw 41 is inserted, is formed on the rotor 40. Further, cam surfaces 40c to 40f, which form a second cam surface in abutment with the cam surfaces 30s to 30y formed on the inner peripheral portion of the stay 30 according to the opening/closing operation of the image reading unit 20, are integrally formed on an outer peripheral portion of the rotor 40.

More specifically, the outer peripheral portion of the rotor 40 is formed into a substantially rectangular shape, with the cam surfaces 40c to 40e formed on a short side of the outer peripheral portion and the cam surface 40f formed on a long side of the outer peripheral portion. The cam surface 40d is a recessed surface formed near a center on the short side. Both wall surfaces of a recessed portion forming the cam surface 40d is asymmetric to each other, and one of the wall surfaces is inclined more steeply than the other of the wall surfaces. The cam surfaces 40c and 40e are formed on both sides of the cam surface 40d, respectively, with the cam surface 40c connected to the steeply inclined wall surface of the cam surface 40d and the cam surface 40e connected to the gently inclined wall surface of the cam surface 40d.

The cam surfaces 30s to 30y of the opening portion 30a of the stay 30 and the cam surfaces 40c to 40f of the rotor 40 have a function of causing the rotor 40 to rotate in the opening portion 30a due to abutment of the respective cam surfaces. Further, the cam surface 30t of the stay 30 and the cam surface 40d of the rotor 40 function as a meshed engagement portion that holds the image reading unit 20 in a first opened state (i.e., opened at a first open angle) by being meshed with each other when the image reading unit 20 is in the first opened state. More specifically, in the meshed engagement portion, the cam surfaces 30t and 40d are meshed with each other when the image reading unit 20 transitions from the closed state in which the image reading unit 20 is closed to a second opened state in which the image reading unit 20 is opened at a second open angle larger than the first open angle, and further transitions from the second opened state to the first opened state. In the present exemplary embodiment, the second opened state is a state in which the image reading unit 20 is maximally opened.

Next, operations of the stay 30 and the rotor 40 at the time of the opening/closing operation of the image reading and recording apparatus 100 will be described.

FIGS. 9A, 9B, 9C, 9D, 9E, and 9F are side views illustrating the stay 30 and the rotor 40 as viewed from the B direction illustrated in FIG. 2, and illustrate the operations of the stay 30 and the rotor 40 accompanying the opening/closing operation of the image reading unit 20.

First, an operation when the image reading unit 20 transitions from the closed state to the first opened state will be described.

Figure 9A:
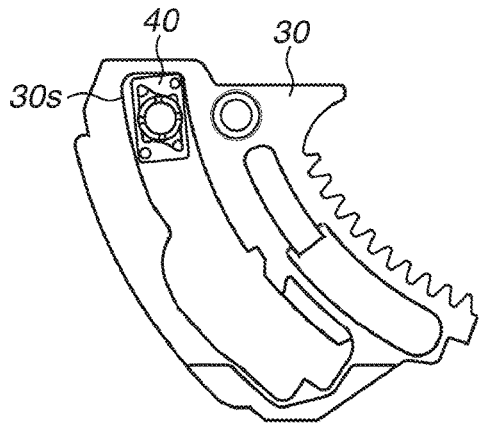
FIGS. 9A, 9B, 9C, 9D, 9E, and 9F illustrate operations of the stay and the rotor.

When the image reading unit 20 is in the closed state, the stay 30 and the rotor 40 are in an initial state illustrated in FIG. 9A, i.e., a state in which the rotor 40 is contained in the cam surface 30s formed at the upper portion of the opening portion 30a of the stay 30. At this time, the rotor 40 is inserted in the opening portion 30a in such a manner that the long side of the outer peripheral portion thereof extends substantially in parallel with the vertical direction.

When the image reading unit 20 is opened by being pivotally moved from the closed state in the +R direction, the rotor 40 slides in the opening portion 30a. When the image reading unit 20 transitions to the second opened state, the rotor 40 reaches the lower portion of the opening portion 30a. At this time, the cam surface 30u of the stay 30 abuts against the cam surface 40c on the lower side of the rotor 40, and applies a rotational torque to the rotor 40 in a P direction illustrated in FIG. 9B. Due to this application, the rotor 40 rotates in the P direction. Then, as illustrated in FIG. 9B, the cam surface 30u of the stay 30 enters the cam surface 40d on the lower side of the rotor 40, and the rotor 40 stops.

Figure 9B:
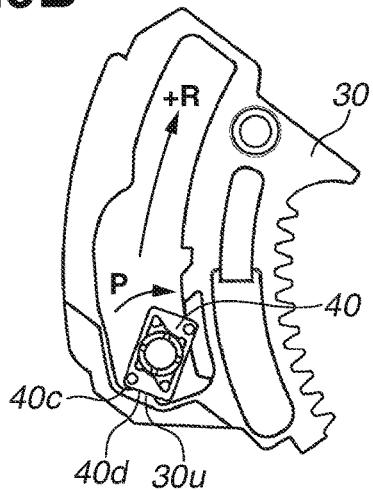
Figure 9C:
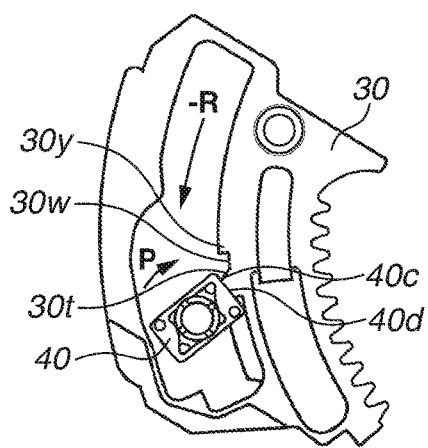

When the image reading unit 20 is pivotally moved from the state illustrated in FIG. 9B in the −R direction, the rotor 40 slides in the opening portion 30a, and the image reading unit 20 transitions to the first opened state. At this time, the cam surface 30t of the stay 30 abuts against the cam surface 40c on the upper side of the rotor 40 illustrated in FIG. 8, and applies a rotational torque to the rotor 40 in the P direction. Due to this application, the rotor 40 rotates in the P direction. Then, as illustrated in FIG. 9C, the cam surface 30t of the stay 30 enters the cam surface 40d on the upper side of the rotor 40, and the rotor 40 stops. This state leads to establishment of the meshed engagement of the cam surface 30t of the stay 30 and the cam surface 40d of the rotor 40 with each other. Therefore, this state leads to a positional relationship kept unchanged between the stay 30 and the rotor 40 and thus a success in holding the image reading unit 20 in the first opened state even if a user of the image reading and recording apparatus 100 takes his/her hand off the image reading unit 20.

Subsequently, an operation when the image reading unit 20 transitions from the first opened state to the closed state will be described.

When the image reading unit 20 is pivotally moved from the state illustrated in FIG. 9C in the +R direction, the rotor 40 slides in the opening portion 30a, and the image reading unit 20 transitions to the second opened state. At this time, the cam surface 30u of the stay 30 abuts against the cam surface 40f of the rotor 40, and applies a rotational torque to the rotor 40 in the P direction. Due to this application, the rotor 40 rotates in the P direction. Then, as illustrated in FIG. 9D, the cam surfaces 30u and 30v of the stay 30 and the cam surfaces 40f and 40e of the rotor 40 illustrated in FIG. 8 abut against each other, respectively, and the rotor 40 stops.

Figure 9D:
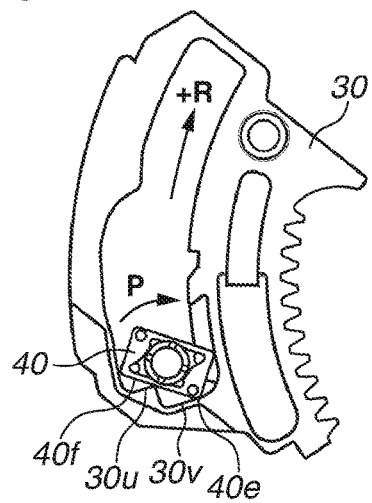

When the image reading unit 20 is pivotally moved from the state illustrated in FIG. 9D in the −R direction, the rotor 40 slides in the opening portion 30a, and the image reading unit 20 transitions to the first opened state. At this time, the cam surface 30t of the stay 30 abuts against the cam surface 40f of the rotor 40 (the cam surface 40f on an opposite side of the cam surface 40f in abutment with the cam surface 30u in FIG. 9D), and applies a rotational torque to the rotor 40 in the P direction. Due to this application, the rotor 40 rotates in the P direction. Then, as illustrated in FIG. 9E, the long side of the outer peripheral portion of the rotor 40 becomes more parallel with the vertical direction.

Figure 9E:
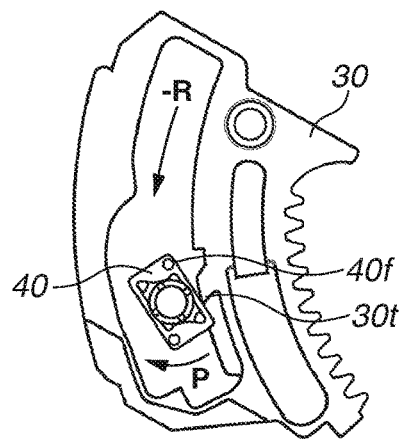
Figure 9F:
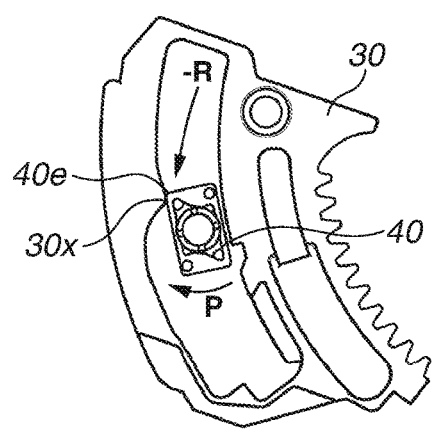

After that, when the image reading unit 20 is further pivotally moved from the state illustrated in FIG. 9E in the −R direction, the rotor 40 slides in the opening portion 30a. Then, as illustrated in FIG. 9F, the cam surface 30x of the stay 30 abuts against the cam surface 40e of the rotor 40, and applies a rotational torque to the rotor 40 in the P direction. Due to this application, the rotor 40 rotates in the P direction and is contained in the cam surface 30s at the upper portion of the opening portion 30a of the stay 30. When the image reading unit 20 transitions to the closed state, the stay 30 and the rotor 40 return to the initial state illustrated in FIG. 9A.

In the above-described operation, when the image reading unit 20 transitions from the first opened state to the second opened state, the cam surface 30t and the cam surface 40d are prevented from being meshed with each other until the image reading unit 20 transitions to the closed state. More specifically, when the image reading unit 20 transitions from the first opened state to the second opened state, the cam surface 30u of the stay 30 abuts against the cam surface 40f of the rotor 40 and the rotor 40 rotates, whereby the stay 30 and the rotor 40 are brought into the state illustrated in FIG. 9D. Therefore, the cam surface 30t and the cam surface 40d are not meshed with each other even when the image reading unit 20 returns to the first opened state, which leads to the prevention of the meshed engagement between the cam surface 30t and the cam surface 40d. Therefore, when the image reading unit 20 returns to the closed state, the pivotal movement is not regulated in the middle thereof.

In the above-described manner, according to the present exemplary embodiment, the cam surfaces 30s to 30y formed on the inner peripheral portion of the opening portion 30a of the stay 30 and the cam surfaces 40c to 40f formed on the outer peripheral portion of the rotor 40 cause the rotor 40 to rotate in the opening portion 30a. Further, the cam surface 30t and the cam surface 40d are meshed with each other when the image reading unit 20 is in the first opened state of being opened at the first open angle, and hold the image reading unit 20 in the first opened state. This configuration allows the image reading and recording apparatus 100 to maintain t e state in which the top of the image recording unit 10 is exposed even without use of a member movable in the direction along the pivotal axis A of the image reading unit 20, like the cam lever. Therefore, the present exemplary embodiment allows the image reading and recording apparatus 100 to be reduced in size while allowing the maintenance to be easily carried out. Further, the stay 30 and the rotor 40 are each shaped like the thin plate, which allows the image reading and recording apparatus 100 to be further reduced in size especially in the X direction illustrated in FIG. 2.

(First Additional Function)

The example illustrated in FIGS. 9A, 9B, 9C, 9D, 9E, and 9F allows the user to refrain from moving the image reading unit 20 to the closed state and return the image reading unit 20 to the first opened state when the image reading unit 20 reaches the state illustrated in FIG. 9F in the middle of moving the image reading unit 20 from the first opened state to the closed state.

More specifically, when the image reading unit 20 is pivotally moved from the state illustrated in FIG. 9F in the +R direction, the rotor 40 slides in the opening portion 30a. When the image reading unit 20 transitions to the second opened state, the stay 30 and the rotor 40 are brought into the state illustrated in FIG. 9B again. Therefore, when the image reading unit 20 is pivotally moved from this state in the −R direction to transition to the first opened state, the cam surface 30t of the stay 30 and the cam surface 40d of the rotor 40 are meshed with each other again as illustrated in FIG. 9C. This means that, when the image reading unit 20 transitions from the first opened state to the second opened state, the cam surface 30t and the cam surface 40d are prevented from being meshed with each other until the image reading unit 20 transitions to the second opened state.

According to the present additional function, the image reading and recording apparatus 100 allows the user to refrain from moving the image reading unit 20 to the closed state and return the image reading unit 20 to the first opened state, even when it becomes necessary to return the image reading unit 20 to the first opened state while the user is moving the image reading unit 20 from the first opened state to the closed state. Therefore, further forming the cam surface 30x of the stay 30 at a position as close to the cam surface 30t as possible facilitates the transition to the state illustrated in FIG. 9F. In this way, user's convenience is further improved.

(Second Additional Function)

In the operation described with reference to FIG. 9, the user first moves the image reading unit 20 to the second opened state by pivotally moving the image reading unit 20 in the +R direction, to cause the image reading unit 20 to transition from the first opened state to the closed state. However, the user can also move the image reading unit 20 to the closed state directly without passing through the second opened state by pivotally moving the image reading unit 20 from the first opened state in the −R direction. This is because the recessed cam surface 30w adjacent to the cam surface 30v forming the meshed engagement portion is formed on the opening portion 30a of the stay 30.

More specifically, when a predetermined force is applied to the image reading unit 20 in the −R direction from the state illustrated in FIG. 9C corresponding to the first opened state, the cam surface 40e of the rotor 40 falls into the cam surface 30w of the stay 30. Further, the cam surface 40e of the rotor 40 is caught at the cam surface 30y of the stay 30, by which the rotor 40 rotates in the P direction to be brought into the state illustrated in FIG. 9F. Therefore, by pivotally moving the image reading unit 20 continuously therefrom in the −R direction, the user can move the image reading unit 20 to the closed state without passing through the second opened state. The predetermined force is different depending on, for example, shapes of the cam surfaces 40d and 40e of the rotor 40 and the cam surfaces 30y and 30w of the stay 30. Therefore, it is possible to adjust the predetermined force for moving the image reading unit 20 to the closed state directly without passing through the second opened state by adjusting these shapes.

According to the present additional function, the present exemplary embodiment allows the image reading and recording apparatus 100 to prevent or reduce breakage of the stay 30 and the rotor 40 even if the user pivotally moves the image reading unit 20 from the first opened state in the −R direction by mistake.

Figure 10:
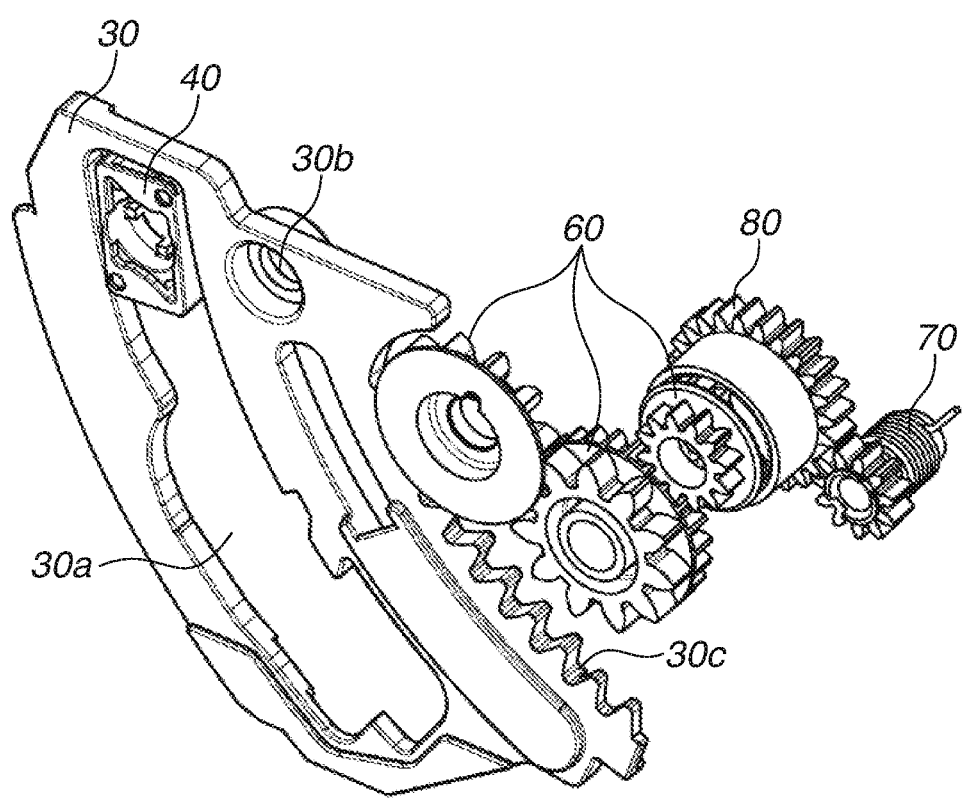
FIG. 10 is a perspective view schematically illustrating main portions of an image reading and recording apparatus according to a second exemplary embodiment of the present invention.

FIG. 10 is a perspective view schematically illustrating main portions of the image reading and recording apparatus 100 according to a second exemplary embodiment of the present invention. FIG. 10 illustrates the stay 30, gears 60, a damper component 70, and a one-way functional component 80.

The gears 60 are coupled with the inner gear 30c of the stay 30. The inner gear 30c is an arc-shaped rack having a pitch circle defined by a circle centered at an intersection point between a plane along the stay 30 and the pivotal axis A of the image reading unit 20, and formed along the direction in which the image reading unit 20 is pivotally moved (the ±R direction). There may be one gear 60, or may be a plurality of gears 60. In the example illustrated in FIG. 10, three gears 60 are coupled.

The damper component 70 damps a pivotal movement of the gears 60. The damper component 70 is, for example, an oil damper or a spring clutch. In the present exemplary embodiment, the damper component 70 is the spring clutch.

The one-way functional component 80 is a one-way mechanism that couples the gears 60 and the damper component 70 with each other, and transmits a pivotal movement involved when the image reading unit 20 is closed, among pivotal movements of the gears 60, to the damper component 70. The one-way functional component 80 rotates idly when the image reading unit 20 is opened, thereby preventing the pivotal movement of the gears 60 from being transmitted to the damper component 70. The one-way functional component 80 is, for example, a pendulum gear or a serrated gear. In the present exemplary embodiment, the one-way functional component 80 is the serrated gear.

According to the present exemplary embodiment described above, when the image reading unit 20 is pivotally moved in the −R direction in which the image reading unit 20 is closed, this pivotal movement is transmitted to the damper component 70 via the gears 60 and the one-way functional component 80 and is damped by the damper component 70. Therefore, the present exemplary embodiment makes it possible to prevent or reduce sudden closing of the image reading unit 20 due to a self-weight of the image reading unit 20 even if the user takes his/her hand off the image reading unit 20 during the opening operation by mistake.

Further, when the image reading unit 20 is pivotally moved in the +R direction in which the image reading unit 20 is opened, the pivotal movement is not transmitted to the damper component 70 by being blocked by the one-way functional component 80, which makes it possible to limit a load imposed on the user to only the weight of the image reading unit 20, thereby improving operability.

In each of the above-described exemplary embodiments, the illustrated configuration is merely one example, and the present invention shall not be limited to this configuration.

For example, an image recording apparatus has been described, citing the image reading and recording apparatus 100 including the image recording unit 10 and the image reading unit 20 as an example thereof, but the image recording apparatus is not limited to this example. The image recording apparatus can be applied to an apparatus including a cover unit supported to be pivotally movable above a recording unit (the image recording unit 10) and configured to be opened and closed by being pivotally moved relative to this recording unit.

In other words, according to the exemplary embodiments of the present invention, the first cam surface provided on the inner peripheral portion of the opening portion and the second cam surface provided on the outer peripheral portion of the rotor inserted in the opening portion are meshed with each other, by which the cover unit is held in the first opened state. Therefore, the exemplary embodiments of the present invention allow the image recording apparatus to be kept in the state in which the top of the recording unit is exposed even without use of the member movable in the direction along the pivotal axis of the cover unit, like the cam lever. Therefore, the exemplary embodiments of the present invention allow the image recording apparatus to be reduced in size while allowing the maintenance to be easily carried out.

While the present invention has been described with reference to exemplary embodiments, it is to be understood that the invention is not limited to the disclosed exemplary embodiments.

This application claims the benefit of Japanese Patent Application No. 2016-150118, filed Jul. 29, 2016, which is hereby incorporated by reference herein in its entirety.

What is claimed is:

1. An image recording apparatus comprising:
    a recording unit including a conveyance unit to convey a recording medium and a recording head configured to carry out recording onto the conveyed recording medium;
    a cover unit supported to be pivotally movable above the recording unit and configured to be opened and closed by being pivotally moved relative to the recording unit;
    a stay attached to a bottom surface of the cover unit and including an opening portion formed thereon;
    a rotor attached to the recording unit and inserted in the opening portion;
    a first cam surface provided on an inner peripheral portion of the opening portion; and
    a second cam surface provided on an outer peripheral portion of the rotor, the second cam surface causing the rotor to rotate by abutment with the first cam surface according to the opening or the closing of the cover unit,
    wherein the cover unit is held in a first opened state in which the cover unit is opened at a first open angle when the cover unit is opened beyond the first open angle from a closed state in which the cover unit is closed, due to meshed engagement of the first cam surface and the second cam surface with each other,
    wherein in a case where the cover unit is opened beyond the first open angle from the first opened state, the first cam surface and the second cam surface are arranged to be prevented from being meshed with each other at the first open angle, by rotation of the rotor, until the cover unit is transitioned to the closed state.

2. The image recording apparatus according to claim 1, wherein the first cam surface and the second cam surface are arranged to be prevented from being meshed with each other until the cover unit is transitioned from the closed state to the first opened state through a second opened state in which the cover unit is opened at a second open angle larger than the first open angle.

3. The image recording apparatus according to claim 2, wherein, when the cover unit transitions from the first opened state to the second opened state, the first cam surface and the second cam surface are arranged to be prevented from being meshed with each other until the cover unit transitions to the closed state.

4. The image recording apparatus according to claim 2, wherein, when the cover unit transitions from the first opened state to the second opened state, the first cam surface and the second cam surface are arranged to be prevented from being meshed with each other until the cover unit transitions to the second opened state again.

5. The image recording apparatus according to claim 1, wherein a protruding surface formed on the inner peripheral portion of the opening portion, and a recessed surface formed on the outer peripheral portion of the rotor are meshed with each other, and wherein the first cam surface includes a recessed surface formed adjacent to the protruding surface.

6. The image recording apparatus according to claim 1, wherein the stay includes an arc-shaped rack formed along a direction in which the cover unit is pivotally moved, and
wherein the image recording apparatus includes a gear coupled with the rack, a damper component configured to damp a pivotal movement of the gear, and a one-way mechanism coupling the gear and the damper component with each other and configured to transmit a pivotal movement involved when the cover unit is closed, among pivotal movements of the gear, to the damper component.

7. The image recording apparatus according to claim 1, wherein the cover unit contains therein a reading unit configured to read an image recorded on a document.

8. The image recording apparatus according to claim 1, wherein the rotor has a first angle at which the first cam surface and the second cam surface are meshed with each other and a second angle at which the first cam surface and the second cam surface are not meshed with each other, and the rotor rotates by the abutment of the first cam surface and the second cam surface with each other to change from the second angle into the first angle in a case where the cover unit is opened beyond the first open angle from the closed state.

* * * * *